United States Patent
Sinha et al.

(10) Patent No.: US 11,093,130 B1
(45) Date of Patent: Aug. 17, 2021

(54) DRAWING TOOL IDENTIFICATION AND RETRIEVAL

(71) Applicant: Adobe Inc., San Jose, CA (US)

(72) Inventors: Deep Sinha, Uttar Pradesh (IN); Ashish Anand, Uttar Pradesh (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/822,826

(22) Filed: Mar. 18, 2020

(51) Int. Cl.
*G06F 3/0488* (2013.01)
*G06T 11/20* (2006.01)
*G06T 11/00* (2006.01)
*G06F 16/51* (2019.01)

(52) U.S. Cl.
CPC .......... *G06F 3/04883* (2013.01); *G06F 16/51* (2019.01); *G06T 11/001* (2013.01); *G06T 11/20* (2013.01)

(58) Field of Classification Search
CPC ...... G06F 3/04883; G06F 16/51; G06T 11/20; G06T 11/001
See application file for complete search history.

(56) References Cited

U.S. PATENT DOCUMENTS

2017/0132768 A1* 5/2017 Bedi ................. H04L 67/36

* cited by examiner

*Primary Examiner* — Christopher J Kohlman
(74) *Attorney, Agent, or Firm* — NDWE LLP

(57) ABSTRACT

Techniques and systems are provided for performing drawing tool identification and retrieval. For instance, based on a user creating content within a digital image using a drawing tool, a drawing tool-retrieval system may determine a unique identifier corresponding to the drawing tool. The identifier may indicate the type of the drawing tool, as well as any configurable settings of the drawing tool selected by the user. The drawing tool-retrieval system can store the identifier in association with pixels corresponding to the content. When the user wishes to use the drawing tool again, the user can provide a drawing tool-picking input that includes selection of a pixel corresponding to the content. In response to the drawing tool-picking input, the drawing tool-retrieval system can obtain the identifier of the drawing tool and then activate the drawing tool to enable the user to edit the image with the drawing tool.

20 Claims, 10 Drawing Sheets

(5 of 10 Drawing Sheet(s) Filed in Color)

600

DETECT INPUT ASSOCIATED WITH A DRAWING TOOL SELECTED BY A USER WITHIN A DIGITAL CANVAS DISPLAYED BY AN APPLICATION, THE INPUT CAUSING AT LEAST ONE PIXEL TO BE RENDERED BY A RENDERING ENGINE USING THE DRAWING TOOL
602

DETERMINE AN IDENTIFIER THAT UNIQUELY IDENTIFIES THE DRAWING TOOL USED TO RENDER THE AT LEAST ONE PIXEL FROM A SET OF DRAWING TOOLS PROVIDED BY THE APPLICATION
604

STORE THE IDENTIFIER OF THE DRAWING TOOL IN ASSOCIATION WITH THE AT LEAST ONE PIXEL
606

DETECT USER INPUT INDICATING A REQUEST TO DETERMINE WHICH DRAWING TOOL OF THE SET OF DRAWING TOOLS WAS USED TO RENDER THE AT LEAST ONE PIXEL
608

DETERMINE, IN RESPONSE TO DETECTING THE USER INPUT, THE DRAWING TOOL FROM THE SET OF DRAWING TOOLS BASED ON THE IDENTIFIER STORED IN ASSOCIATION WITH THE AT LEAST ONE PIXEL
610

OUTPUT, TO THE USER, AN INDICATION OF THE DRAWING TOOL
612

```
           IDENTIFIER    DRAWING TOOL
           0001          Brush 1
           0010          Brush 2
           0011          Brush 3
           0100          Brush 4
           0101          Brush 5
```

```
0010  0110  0011  1001
 ⌣     ⌣    ⌣     ⌣
306   308   310   312
```

600

```
┌─────────────────────────────────────────────────────────────────────┐
│ DETECT INPUT ASSOCIATED WITH A DRAWING TOOL SELECTED BY A USER WITHIN A │
│ DIGITAL CANVAS DISPLAYED BY AN APPLICATION, THE INPUT CAUSING AT LEAST ONE │
│   PIXEL TO BE RENDERED BY A RENDERING ENGINE USING THE DRAWING TOOL │
│                                 602                                 │
└─────────────────────────────────────────────────────────────────────┘
                                  ↓
┌─────────────────────────────────────────────────────────────────────┐
│ DETERMINE AN IDENTIFIER THAT UNIQUELY IDENTIFIES THE DRAWING TOOL USED TO │
│  RENDER THE AT LEAST ONE PIXEL FROM A SET OF DRAWING TOOLS PROVIDED BY │
│                           THE APPLICATION                           │
│                                 604                                 │
└─────────────────────────────────────────────────────────────────────┘
                                  ↓
┌─────────────────────────────────────────────────────────────────────┐
│ STORE THE IDENTIFIER OF THE DRAWING TOOL IN ASSOCIATION WITH THE AT LEAST │
│                              ONE PIXEL                              │
│                                 606                                 │
└─────────────────────────────────────────────────────────────────────┘
                                  ↓
┌─────────────────────────────────────────────────────────────────────┐
│ DETECT USER INPUT INDICATING A REQUEST TO DETERMINE WHICH DRAWING TOOL │
│  OF THE SET OF DRAWING TOOLS WAS USED TO RENDER THE AT LEAST ONE PIXEL │
│                                 608                                 │
└─────────────────────────────────────────────────────────────────────┘
                                  ↓
┌─────────────────────────────────────────────────────────────────────┐
│ DETERMINE, IN RESPONSE TO DETECTING THE USER INPUT, THE DRAWING TOOL │
│    FROM THE SET OF DRAWING TOOLS BASED ON THE IDENTIFIER STORED IN  │
│              ASSOCIATION WITH THE AT LEAST ONE PIXEL                │
│                                 610                                 │
└─────────────────────────────────────────────────────────────────────┘
                                  ↓
┌─────────────────────────────────────────────────────────────────────┐
│                                                                     │
│        OUTPUT, TO THE USER, AN INDICATION OF THE DRAWING TOOL       │
│                                 612                                 │
│                                                                     │
└─────────────────────────────────────────────────────────────────────┘
```

FIG. 6

DRAWING TOOL IDENTIFICATION AND RETRIEVAL

FIELD

This application is generally related to drawing tool-retrieval solutions. For example, aspects of this application relate to associating a drawing tool (e.g., a digital drawing or painting tool, such as a digital paintbrush) with content generated by the drawing tool within a digital image. Using the association, the drawing tool can be intelligently identified and retrieved (e.g., in response to input indicating a request to determine the brush), enabling a user to edit the image using the drawing tool.

BACKGROUND

Modern drawing or painting applications can allow users to digitally create and edit highly detailed images with a wide variety of artistic styles. The applications may enable users to generate such images by providing a large array of drawing tools (commonly referred to as paintbrushes or simply brushes). For example, a brush may generate brushstrokes with a specific texture, size, artistic effect, etc. In addition, some applications may allow the user to customize or configure a brush by selecting settings such as the color, width, tilt, pressure, and/or shape of brushstrokes drawn by the brush. Thus, an application may offer users hundreds or even thousands of possible brush configurations. When a user is creating an image (or editing the image at a later point in time), the user may wish to use a brush (or brush configuration) corresponding to one or more previously drawn brushstrokes. For instance, the user may wish to edit a feature of the image drawn using the brush, or add new features using the brush.

However, digital painting applications may not include a mechanism or tool capable of indicating which drawing tools (e.g., digital paintbrushes, pencils, or other drawing tool) were used to draw specific brushstrokes within an image. Thus, if the user is unable to remember (or does not know) a previously used brush and/or the exact settings of the brush, the user may be required to test multiple brushes and/or settings before finding the correct brush (if the correct brush is ever found). This problem may be exacerbated by applications that allow users to create large, detailed, or complex images, such as images with multiple layers (e.g., logical divisions of an image that contain content rendered on top of or beneath the content of one or more other layers). These images may generally include a large number of brushstrokes, and a corresponding number of different brushes. Therefore, brush-picking systems and techniques are described herein that enable users to access brushes previously used to create content within digital images.

SUMMARY

Drawing tool-retrieval systems and related techniques are described herein that perform drawing tool identification and retrieval tasks. For instance, based on a user drawing content (such as a brushstroke) within a digital image using a drawing tool (such as a digital paintbrush), a drawing tool-retrieval system may determine a unique identifier corresponding to the drawing tool. The identifier may indicate the type of the drawing tool, as well as any configurable settings of the drawing tool selected by the user. The drawing tool-retrieval system can then store the identifier in association with the content (e.g., in association with each pixel corresponding to the content). When the user wishes to use the drawing tool at a later point in time, the user can provide a drawing tool-picking input. The drawing tool-picking input can include selection of a pixel corresponding to the content. In response to the drawing-tool-picking input, the drawing tool-retrieval system can obtain the identifier of the drawing tool to determine properties and/or settings of the drawing tool. Based on the properties and/or settings of the drawing tool, the drawing tool-retrieval system can activate or replicate the drawing tool to enable the user to edit the image with the drawing tool. In one example, based on the drawing tool-picking input, the system can display an icon corresponding to the drawing tool. The user can select the drawing tool for editing the image by selecting the icon.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the present application are described in detail below with reference to the following drawing:

FIG. 6 is a flowchart illustrating an example of a process of brush-picking, in accordance with some examples provided herein;

DETAILED DESCRIPTION

Figure 1A:
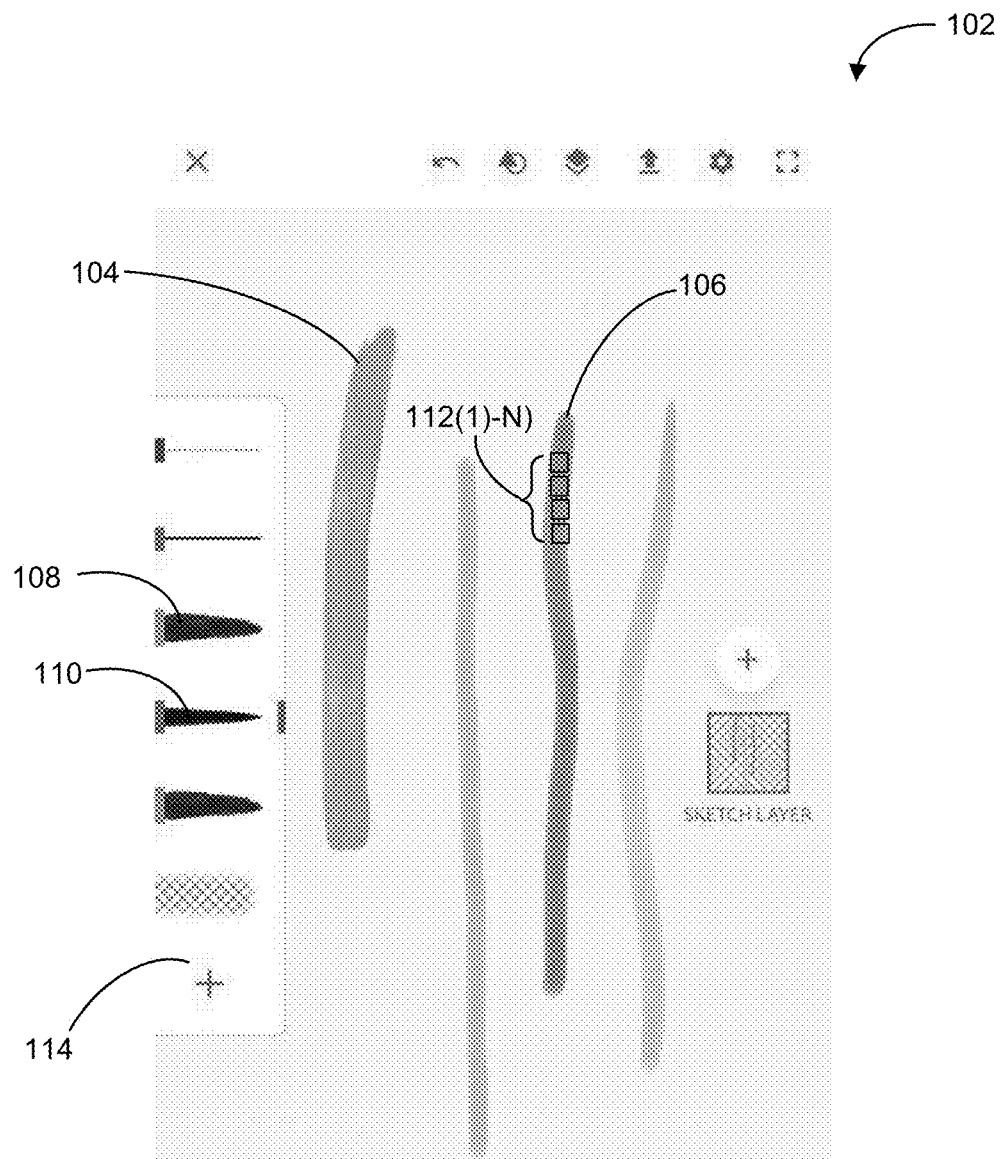
FIG. 1A, FIG. 1B, and FIB. 1C are illustrations of examples of brushstrokes drawn within digital canvases, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Drawing tools, as used herein, include any type or form of software-based model or replication of a physical tool for creating art, text, or other images on a canvas, such as paintbrushes, pencils, pens, markers, charcoals, crayons, pastels, among others. A digital painting or drawing application may allow a user to select and/or configure a drawing tool (from a set of multiple drawing tools) and then create or edit content within a digital canvas using the drawing tool. In some cases, the user can draw content (e.g., brushstrokes) within the digital canvas by providing input such as dragging a cursor, stylus, or finger over a user interface displaying the canvas. While the following description may refer to "brushes" and the content created by the brushes as "brushstrokes," this nomenclature merely represents an illustrative example of the disclosed techniques and systems, and is not intended to be limiting. Rather, a brush may correspond to any type of artistic tool or medium, and may be used to simulate drawings, paintings, sketches, or any additional type of image.

When a user is creating an image (or editing the image at a later point in time), the user may wish to use a brush corresponding to one or more previously drawn brushstrokes. For instance, the user may wish to edit a feature of the image drawn using the brush, or add new features using the brush. However, digital painting applications may not include a mechanism or tool capable of indicating which brushes were used to draw specific brushstrokes within an image. Thus, if the user is unable to remember (or does not know) a previously used brush and/or the exact settings of the brush, the user may be required to test multiple brushes and/or settings before finding the correct brush (if the correct brush is ever found). This problem may be exacerbated by applications that allow users to create large, detailed, or complex images, such as images with multiple layers.

Systems and related techniques are provided herein which provide benefits and solve one or more problems related to enabling users to access brushes previously used to create content within digital images. In some cases, this task may be referred to as brush-picking.

The task of brush-picking may be generally divided into two components. The first component relates to storing an identifier of a brush used to draw a brushstroke in association with pixels corresponding to the brushstroke. The second component relates to replicating or activating the brush in response to a user performing a brush-picking input over the pixels. Referring to the first component, a brush-picking system may determine the identifier of a brush that is currently being used to draw a brushstroke within an image. The brush identifier may uniquely identify the brush from a set of brushes provided by an application. If the application allows the user to select or configure one or more settings of the brush, the identifier may correspond to the settings (e.g., in addition to indicating the type or name of the brush). In an illustrative example, the identifier may include an integer of a predetermined number of bits, such as 16 bits or 32 bits. After determining the brush identifier, the brush-picking system may store the identifier in association with each pixel corresponding to the brushstroke. For instance, the brush-picking system may store the identifier within a data structure that contains data describing the state (e.g., color and/or intensity) of a pixel after the brushstroke is drawn. If the pixel corresponds to two or more overlapping brushstrokes drawn with different brushes, the brush-picking system can store identifiers of each brushstroke in association with the pixel. In some cases, the identifier (or the data structure storing the identifier) may reference a metadata file that maps various brush identifiers to corresponding brush types and/or settings.

In some examples, the brush-picking system can determine and store the brush identifier while a rendering engine (such as a shader implemented by a GPU and/or CPU) renders the pixels. For instance, the rendering engine may receive and/or utilize the brush identifier in order to render the pixels in accordance with the brush. In some examples, the brush-picking system may be part of and/or in communication with the rendering engine. As such, the brush-picking system may obtain knowledge of (and then store) the brush identifier as an individual pixel is rendered in real-time. However, the brush-picking system may determine and store brush identifiers at any point after the pixels corresponding to the brushstroke are rendered.

After the brushstroke is rendered within the image, a user (either the user that drew the brushstroke or another user) may wish to edit the image using the same brush that was used to draw the brushstroke. Referring to the second component of the disclosed brush-picking techniques, the brush-picking system may be configured to recognize a predetermined brush-picking input corresponding to a request to use the brush. In one illustrative example, the brush-picking input may include dragging a brush-picking tool from a toolbar to a location corresponding to a pixel of the brushstroke within the image. In response to detecting the brush-picking input, the brush-picking system may obtain the brush identifier stored in association with the pixel. For instance, the brush-picking system may extract the identifier from the data structure that stores data describing the rendered state of the pixel. Based on the identifier, the brush-picking system may activate the brush within the image. For instance, the brush-picking system may determine specific properties and/or settings of the brush (e.g., using the metadata file referenced by the data structure) and then configure a brush that is currently active within the image to correspond to the properties and/or settings. Thus, the disclosed brush-picking systems may enable users to quickly and easily draw new brushstrokes that exactly match the style of previously drawn brushstrokes, avoiding tedious guesswork to recreate specific brushes.

Figure 1B:
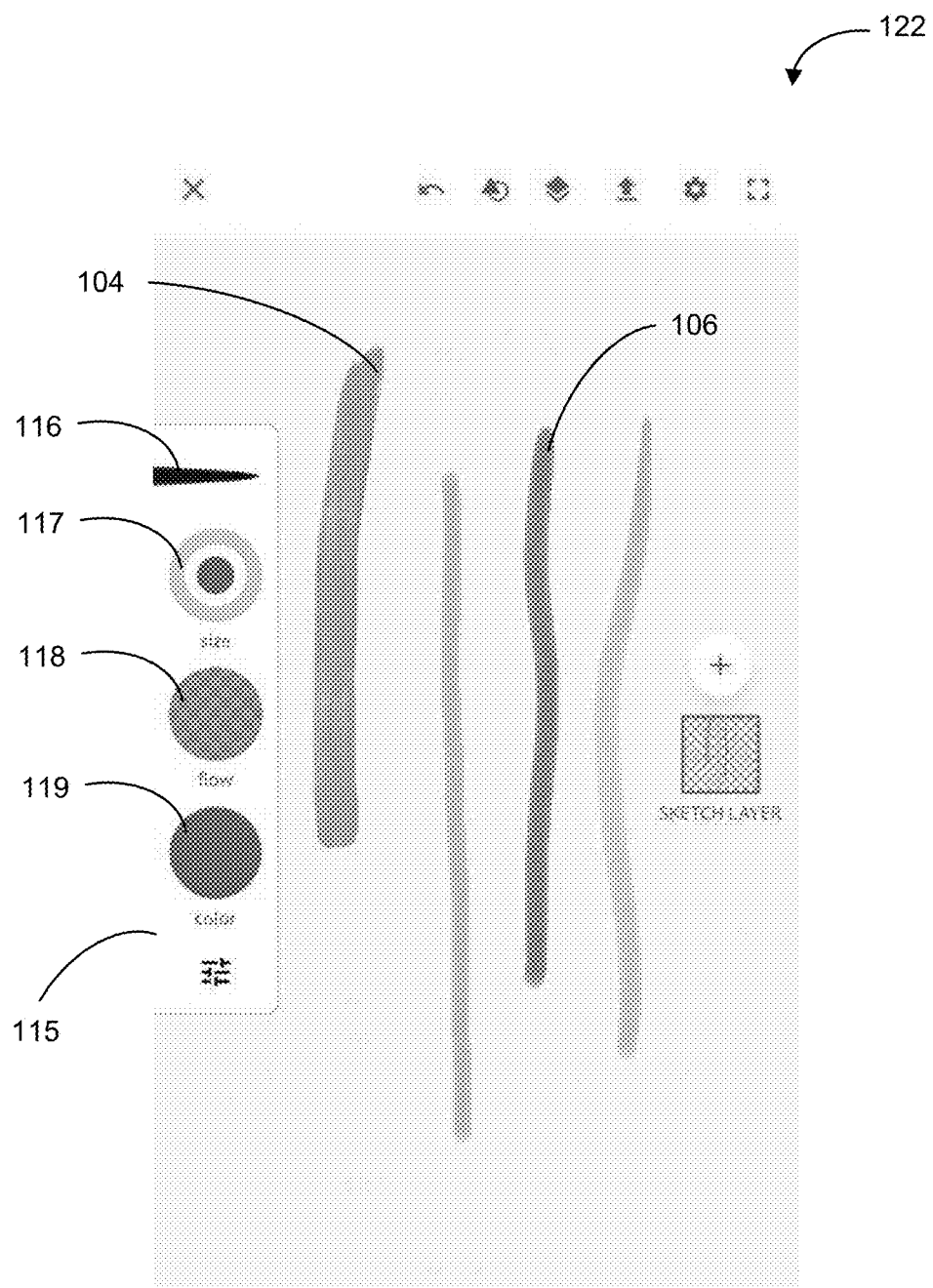
Figure 1C:
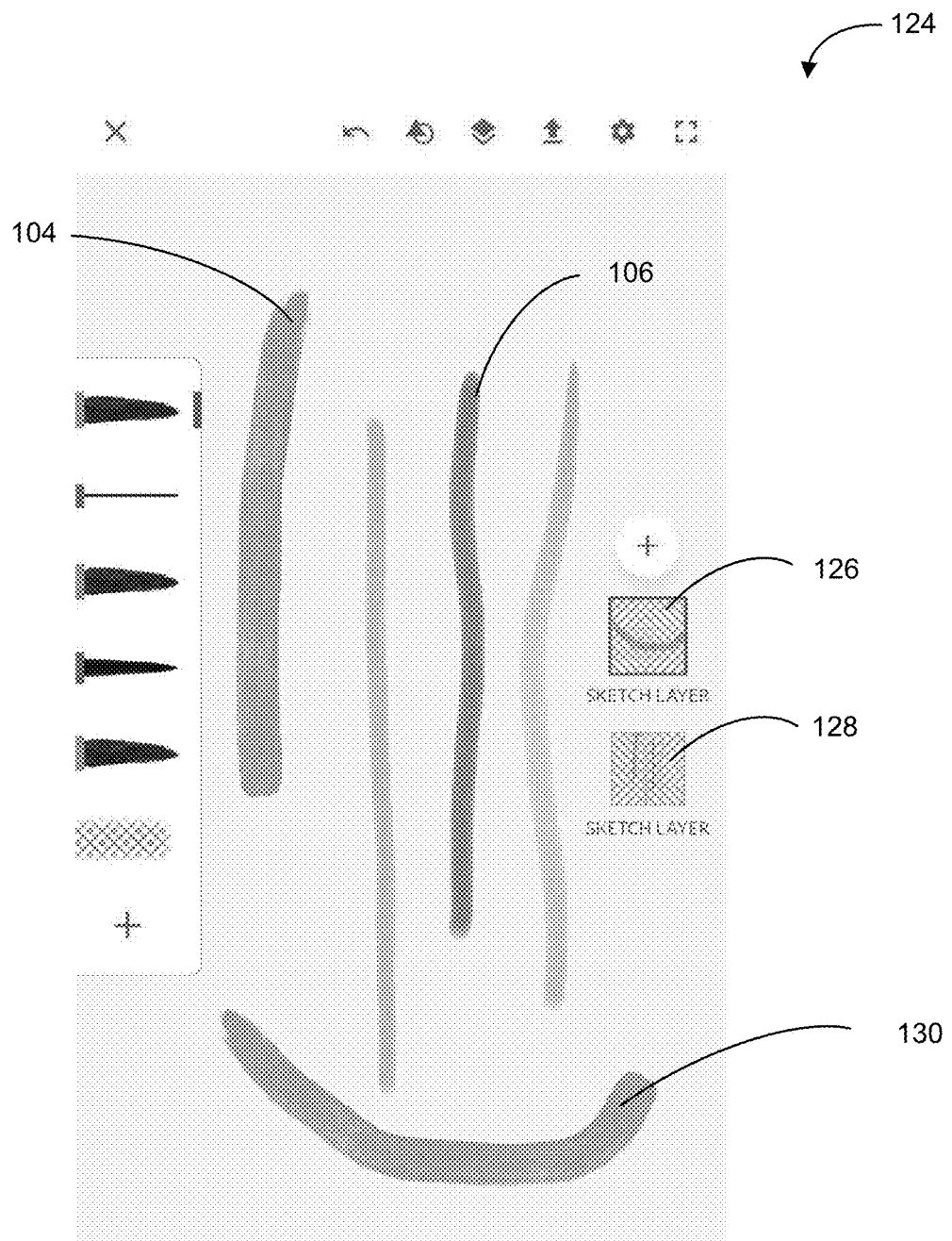

FIG. 1A, FIG. 1B, and FIG. 1C illustrate various example brushstrokes drawn within digital canvases. Specifically, FIG. 1A illustrates a canvas 102 that includes a brushstroke 104 and a brushstroke 106. A toolbar 114 displayed within the canvas 102 indicates various brushes (such as a brush 108 and a brush 110) used to draw the brushstrokes within the canvas 102. In this example, the brushstroke 104 was drawn using the brush 108 and the brushstroke 106 was drawn using the brush 110. In some cases, the brush 108 and the brush 110 may correspond to different brushes within a set of brushes provided by an application. As an illustrative example, the brush 108 may correspond to an "oil paint" brush and the brush 110 may correspond to a "marker" brush. In addition, the brush 108 and the brush 110, as used within the canvas 102, may be configured with different brush settings. As an example, FIG. 1B illustrates a canvas 122 that displays various settings of the brush 110 within a toolbar 115. Specifically, a setting 116 represents the type or name of the brush 110 (e.g., "marker"). Settings 117, 118, and 119 correspond to configurable settings that have been selected by a user. As shown in FIG. 1B, the setting 117 may indicate the size of brushstrokes drawn by the brush 110, the setting 118 may indicate the flow (e.g., density) of brushstrokes drawn by the brush 110, and the setting 119 may indicate the color of brushstrokes drawn by the brush 110. The brush 110 may include any additional or alternative setting not illustrated in FIG. 1B. Further, as mentioned above, a digital image may include multiple layers (e.g., logical divisions of the image that contain content rendered on top of or beneath the content of one or more other layers). FIG. 1C illustrates a canvas 124 that includes a layer 126 and a layer 128. In this example, the layer 126 includes a brushstroke 130 and the layer 128 includes the brushstrokes 104 and 106 illustrated in FIG. 1A and FIG. 1B. In some cases, the layers 126 and 128 may be accessed and/or edited separately.

Figure 2:
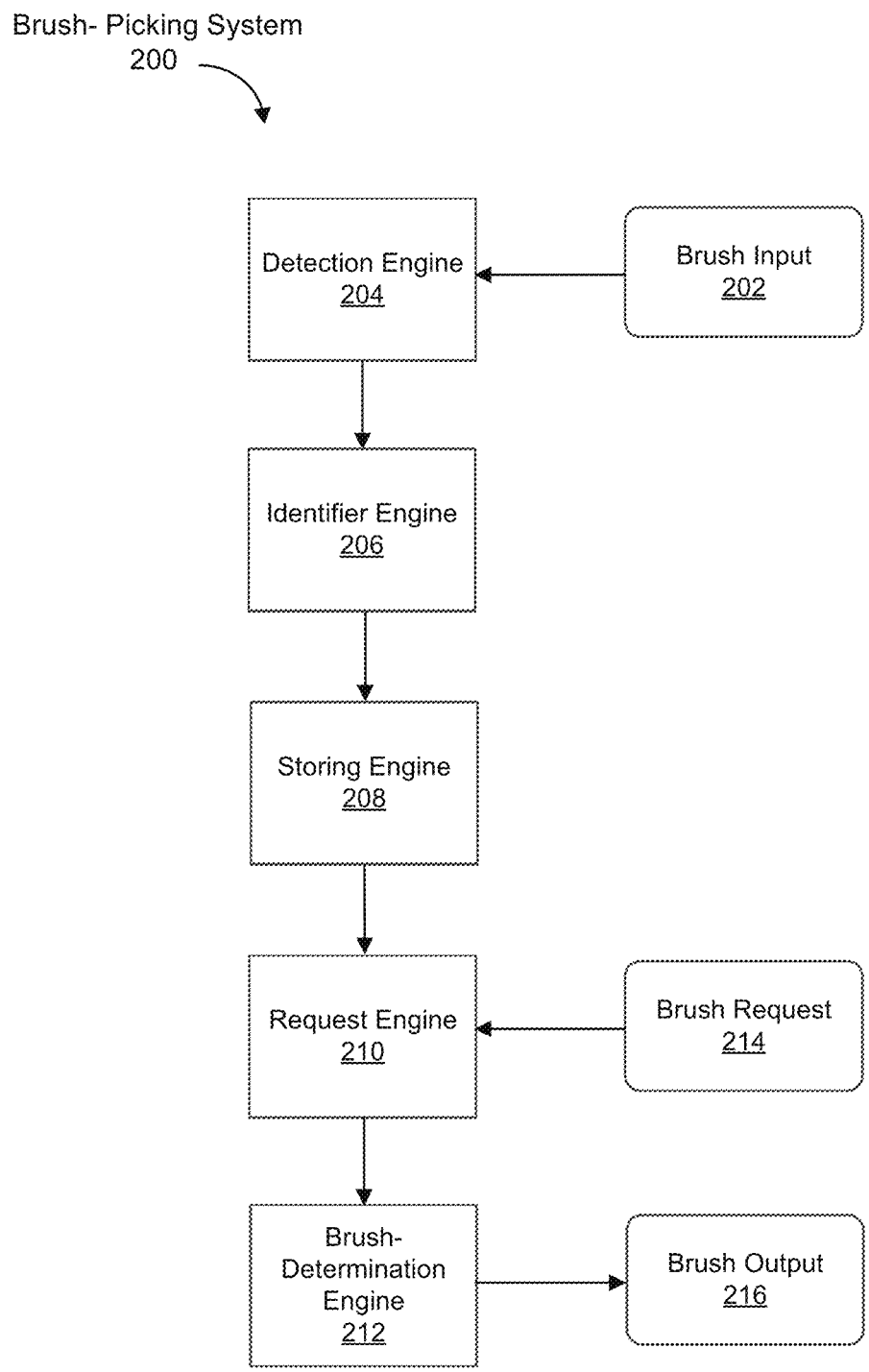
FIG. 2 is a block diagram illustrating an example of a brush-picking system, in accordance with some examples provided herein.

FIG. 2 is a diagram illustrating an example of a brush-picking system 200 that can be used to perform the brush-picking techniques described herein. The brush-picking system 200 includes various components, including a brush input 202, a detection engine 204, an identifier engine 206, a storing engine 208, a request engine 210, a brush-determination engine 212, and a brush request 214. The components of the brush-picking system 200 can include software, hardware, or both. For example, in some implementations, the components of the brush-picking system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the brush-picking system 200.

While the brush-picking system 200 is shown to include certain components, one of ordinary skill will appreciate that the brush-picking system 200 can include more or fewer components than those shown in FIG. 2. For example, the brush-picking system 200 can include, or can be part of a computing device that includes, one or more input devices and one or more output devices (not shown). In some implementations, the brush-picking system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the brush-picking system 200 can be implemented by and/or included in a computing device. In some cases, multiple computing devices can be used to implement the brush-picking system 200. For example, a computing device used to implement the brush-picking system 200 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the brush-picking system 200 can be integrated with (e.g., integrated into the software, added as one or more plug-ins, included as one or more library functions, or otherwise integrated with) one or more software applications, such as a search engine, a web browser, a design application (e.g., Adobe InDesign™, Adobe Illustrator™, Adobe Acrobat™, Adobe Photoshop™, Adobe After Effects™, among others), or other software application that allows a user (also referred to as an end-user) to create and edit digital images using one or more brushes. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the brush-picking system 200 can be implemented in a suite of software applications.

In some cases, the brush input 202 includes input corresponding to a brushstroke within a digital canvas. For instance, the brush input 202 may correspond to a user drawing a brushstroke via an input mechanism such as dragging a cursor, stylus, or finger (when using a device equipped with a touch-screen) over a user interface displaying the digital canvas. The detection engine 204 can monitor the user interface to detect the brush input 202. For instance, the detection engine 204 can periodically or continuously monitor input provided to the user interface to determine when the user initiates a brushstroke, is currently drawing a brushstroke, and/or has finished drawing a brushstroke.

In some cases, the detection engine 204 can identify all or a portion of the pixels corresponding to the brushstroke. A pixel may refer to a graphical element or unit of an image, screen, interface, and/or display. In one example, a pixel may represent the smallest configurable visual element of an image. As a user draws a brushstroke within a digital canvas, pixels of the digital canvas corresponding to the location of the brushstroke may be rendered to display the brushstroke. For instance, the appearance of a pixel may be described or defined by an intensity value. The intensity value may be an integer value or a floating point value corresponding to the color, brightness, or other visual quality of the pixel. In an illustrative example, the intensity value of a pixel rendered using a red-green-blue (RGB) color model may be represented using three 8-bit integers. When a user provides input to change the appearance of a portion of a user interface (such as by drawing a brushstroke within a digital canvas), new and/or updated intensity values of pixels corresponding to the input are determined (e.g., by a rendering engine). The pixels are then rendered (e.g., changed in appearance) in accordance with the determined intensity values. In some cases, the detection engine 204 can determine the location of each pixel rendered as a result of a user drawing a brushstroke. The detection engine 204 can identify the pixels in real-time (e.g., as the pixels are rendered), or at any point after the pixels are rendered. As an example, the detection engine 204 can identify pixels 112(1)-(N) of brushstroke 106 shown in FIG. 1A as each pixel is rendered.

Figure 3A:
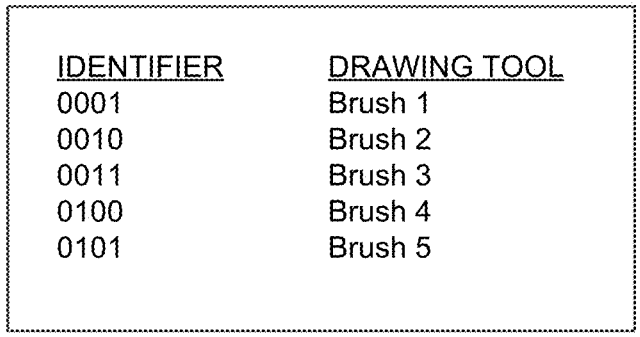
FIG. 3A and FIG. 3B are illustrations of example brush identifiers, in accordance with some examples provided herein.
Figure 3B:
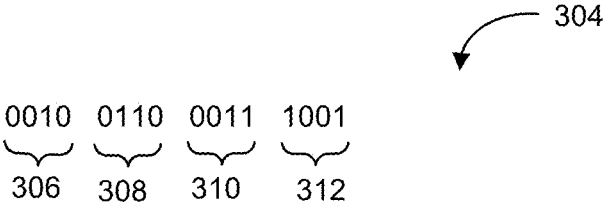

In some examples, the identifier engine 206 can determine an identifier of a brush used to draw a brushstroke within a digital canvas. A brush identifier may refer to a number, value, sequence, and/or string that uniquely identifies a brush from multiple brushes (e.g., from a set of brushes provided by an application). A brush identifier may correspond to a globally unique identifier (GUID), a universally unique identifier (UUID), or any additional type of identifier. FIG. 3A and FIG. 3B illustrate example brush identifiers. Specifically, FIG. 3A illustrates a table 302 that maps brush identifiers to various brushes within a set of brushes provided by an application. In this example, each identifier corresponds to a unique 4-bit integer. As shown in FIG. 3A, identifiers with values 1-5 correspond to brushes 1-5, respectively. In an illustrative example, brush 1 may correspond to a pattern brush, brush 2 may correspond to a scatter brush, brush 3 may correspond to an illustrator brush, brush 4 may correspond to one type of art brush, and brush 5 may correspond to another type of art brush.

In some cases, a brush identifier may indicate one or more configurable settings of a brush (in addition to the type or name of the brush). For instance, a brush identifier may indicate a selected brushstroke width, a selected brushstroke color, a selected brushstroke texture or effect, a selected brushstroke pressure or density, among others. FIG. 3B illustrates an example identifier 304 that indicates various configurable settings of a brush. In this example, the identifier 304 includes a 16-bit integer. The 16-bit integer is divided into four subsets that each contain four bits and that each correspond to a different property or setting of the brush. For instance, a subset 306 may correspond to the brush type (e.g., brush 2 illustrated in FIG. 3A). A subset 308 may correspond to a selected brushstroke width. In this example, an application may enable a user to select a brushstroke width value from a set of possible brushstroke width values (such as 5 values or 10 values). The value indicated by subset 308 may match or correspond to the selected value. Similarly, a subset 310 may correspond to a selected brushstroke color and a subset 312 may correspond to a selected brushstroke pressure. Although FIG. 3B illustrates the identifier 304 as a 16-bit integer, the identifier 304 may include any number of bits (such as 8 bits or 32 bits), as well as any number of bit subsets sufficient to indicate each possible brush type and/or brush setting configuration provided by an application.

Returning to FIG. 2, after the identifier engine 206 determines an identifier of a brush used to draw a brushstroke, the storing engine 208 can store the brush identifier in association with pixels corresponding to the brushstroke. For instance, the identifier engine 206 can include the identifier within a data structure that contains data corresponding to a rendered state of a pixel. In one example, the data structure may contain an integer (e.g., a 16-bit or 32-bit integer) indicating the color or intensity value of the rendered pixel. As will be explained in more detail below, this data structure may be created and/or populated by a rendering engine that renders the pixel within the digital canvas. The storing engine 208 can include the brush identifier within the data structure in a variety of ways, such as by inserting the brush identifier within the data structure or appending the brush identifier to the data structure. The storing engine 208 can store the brush identifier as the data structure is created and/or populated (e.g., by a rendering engine), or after the data structure has been created and/or populated.

In some cases, the storing engine 208 can store a brush identifier in association with each pixel corresponding to a rendered brushstroke. For instance, for each pixel of the brushstroke, the storing engine 208 can store a separate instance of the brush identifier in a separate data structure associated with the pixel. In addition, the storing engine 208 can store brush identifiers in association with pixels of each additional brushstroke within a digital canvas. Further, if a pixel corresponds to more than one brush (e.g., if a user draws two or more overlapping brushstrokes using different brushes), the brush-picking system 200 can determine brush identifiers of each brush and store the brush identifiers in association with the pixel. In one example, the storing engine 208 may store each brush identifier in a separate data structure associated with the pixel. Alternatively, the storing engine 208 may store a combined brush identifier corresponding to an amalgamation and/or composite of each brush used to draw brushstrokes corresponding to the pixel. In some cases, this combined brush identifier may represent a brush configured to generate brushstrokes corresponding to the final rendered state of the pixel (e.g., the state of the pixel after each overlapping brushstroke has been rendered). Further, if an image includes multiple layers, the storing engine 208 may store the identifier of a brush in association with a layer corresponding to a brushstroke drawn by the brush. For instance, the storing engine 208 may store data structures corresponding to one layer of an image in a file and/or location that is different than a file and/or location used to store data structures corresponding to another layer of the image.

In some examples, the storing engine 208 can maintain a file that maps various brush identifiers to specific brushes and/or brush settings. For instance, the file may contain information such as the information illustrated in FIG. 3A. In an illustrative example, the file may correspond to a JavaScript Object Notation (JSON) file or other type of open standard file. The storing engine 208 may store this file in association with a digital drawing application and/or in association with images created and stored using the application. In addition, an identifier stored in association with an image may reference (e.g., point to) the file. Thus, the file may be accessed and/or retrieved when the identifier is accessed and/or retrieved. As will be explained in more detail below, the information within the file may facilitate providing users with brushes previously used to render brushstrokes within a digital image. The storing engine 208 can store settings and/or properties of brushes in any additional or alternative manner, such as directly within data structures that indicate the rendered state of pixels.

Figure 4:
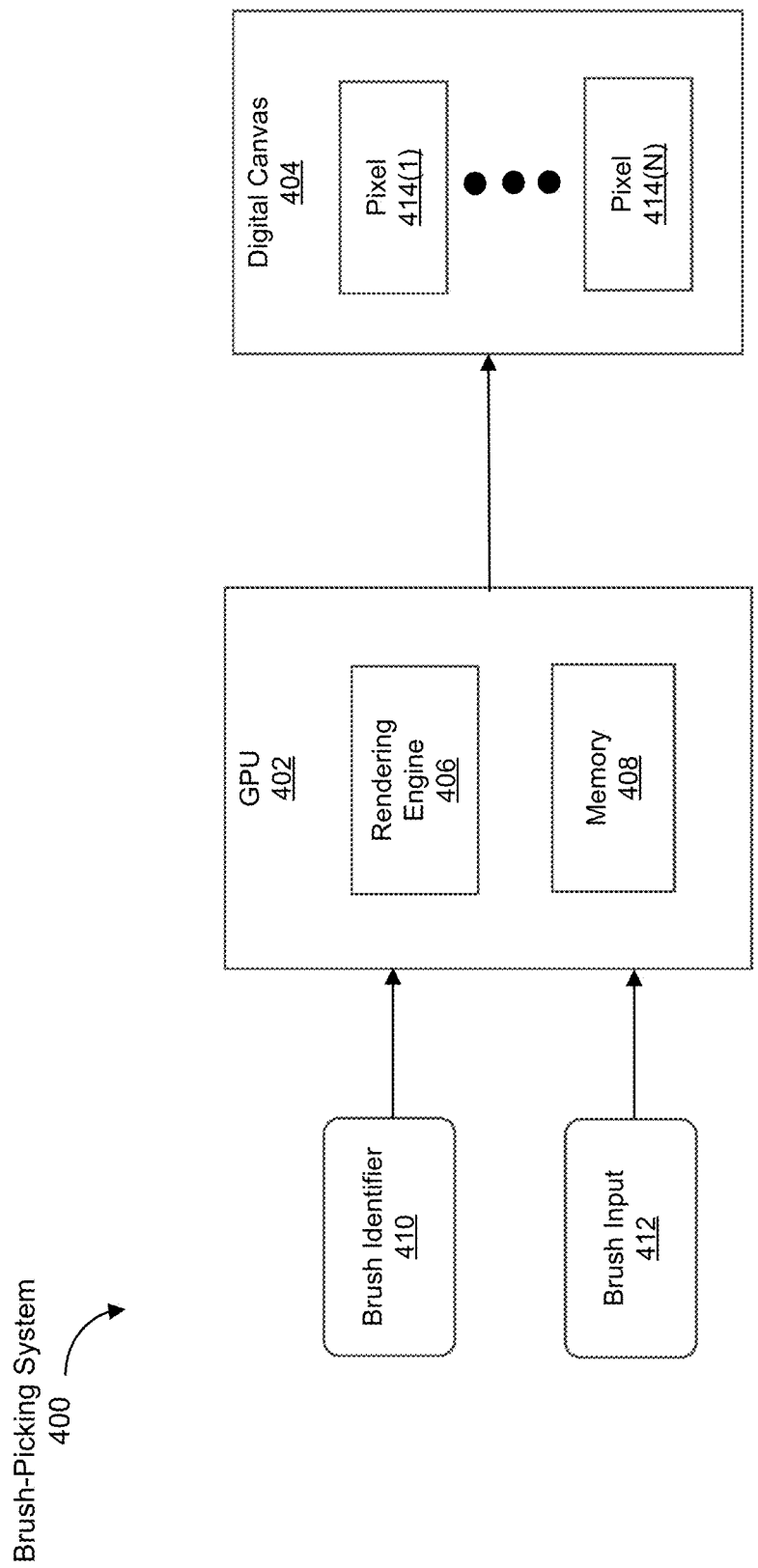
FIG. 4 is a block diagram illustrating an example of a brush-picking system, in accordance with some examples provided herein.

FIG. 4 illustrates an example brush-picking system 400 that can be used to perform the brush-picking techniques described herein. Specifically, the brush-picking system 400 illustrates various elements and components that may be utilized by the brush-picking system 200 to store brush identifiers in association with pixels. The brush-picking system 400 may include and/or implement all or a portion of the brush-picking system 200. As shown in FIG. 4, the brush-picking system 400 may include a digital canvas 404. The digital canvas 404 may correspond to a digital image that displays brushstrokes input by a user to a digital drawing application. The digital canvas 404 may include pixels 414(1)-(N) that are rendered in accordance with the brushstrokes input by the user. In some cases, the pixels 414(1)-(N) are rendered by a GPU 402. Specifically, the pixels 414(1)-(N) may be rendered by a rendering engine 406 implemented and/or executed by the GPU 402. The GPU 402 may include any additional component or element, such as memory 408 (e.g., a portion of RAM and/or ROM). In addition, while FIG. 4 includes the GPU 402, the brush-picking system 400 may include one or more CPUs in addition to or instead of the GPU 402. For instance, the brush-picking system 400 may be implemented at least in part by any CPU capable of rendering pixels within digital canvases.

In some cases, the rendering engine 406 may include a shader. A shader may be a program, function, or other portion of executable code that outputs and/or determines the rendered state of a pixel (e.g., the intensity value of the pixel) using input received in association with the pixel. In the example of FIG. 4, the shader of the rendering engine 406 may receive user input including a brush identifier 410 and brush input 412. In some cases, this input may be provided to the shader by a digital drawing application displaying the digital canvas 404. The brush identifier 410 may include a brush identifier that indicates the type of the brush currently selected by the user, as well as any configurable settings of the brush selected by the user. In addition, the brush input 412 may include a pixel of the pixels 414(1)-(N) that corresponds to a brushstroke drawn by the user. Based at least in part on the brush identifier 410, the rendering engine 406 may determine a rendered state of the pixel indicated by the brush input 412. The rendering engine 406 may then render the pixel within the digital canvas 404. In addition, the rendering engine 406 may store the rendered state of the pixel in a data structure associated with the pixel. In some cases, the storing engine 208 may monitor and/or be a part of the rendering engine 406. For instance, the storing engine 208 (and any additional engines of the brush-picking system 200) may correspond to the shader of the rendering engine 406. Thus, based on the input provided to the GPU 402, the storing engine 208 may have knowledge of the brush identifier corresponding to each pixel within the digital canvas 404 and can efficiently store the brush identifiers in association with the pixels. In some cases, the storing engine 208 can store the brush identifiers in real-time (e.g., as each of pixels 414(1)-(N) are rendered).

Data structures containing brush identifiers and/or the final state of rendered pixels may be stored in a variety of ways and/or file formats. In some cases, the brush-picking system 400 may store these data structures in an image file format that is accessible and/or retrievable by one or more additional digital drawing applications. As an illustrative example, an Adobe Photoshop™ application may store the state of an image within a .PSD file. This .PSD file may be opened by other Adobe Photoshop™ applications (e.g., other versions of the application). In addition, the .PSD file may be converted to and/or exported as another file format (such as a .PNG file) that is compatible with other digital drawing applications (such as Adobe Illustrator™). Thus, data structures associated with the pixels of an image can be accessible to the application and/or the user that generated the original version of the image, as well as accessible to various other applications and/or users.

Storing brush identifiers in association with pixels of a digital canvas may enable the brushes to be replicated and/or re-activated within the digital canvas. For instance, returning to FIG. 2, the request engine 210 may receive the brush request 214, which includes any type or form of user input indicating a request to determine a brush used to draw a brushstroke within a digital canvas. In response to receiving the brush request 214, the brush-picking system 200 may identify the brush and enable a user that provided the brush request 214 to use the brush.

Figure 5A:
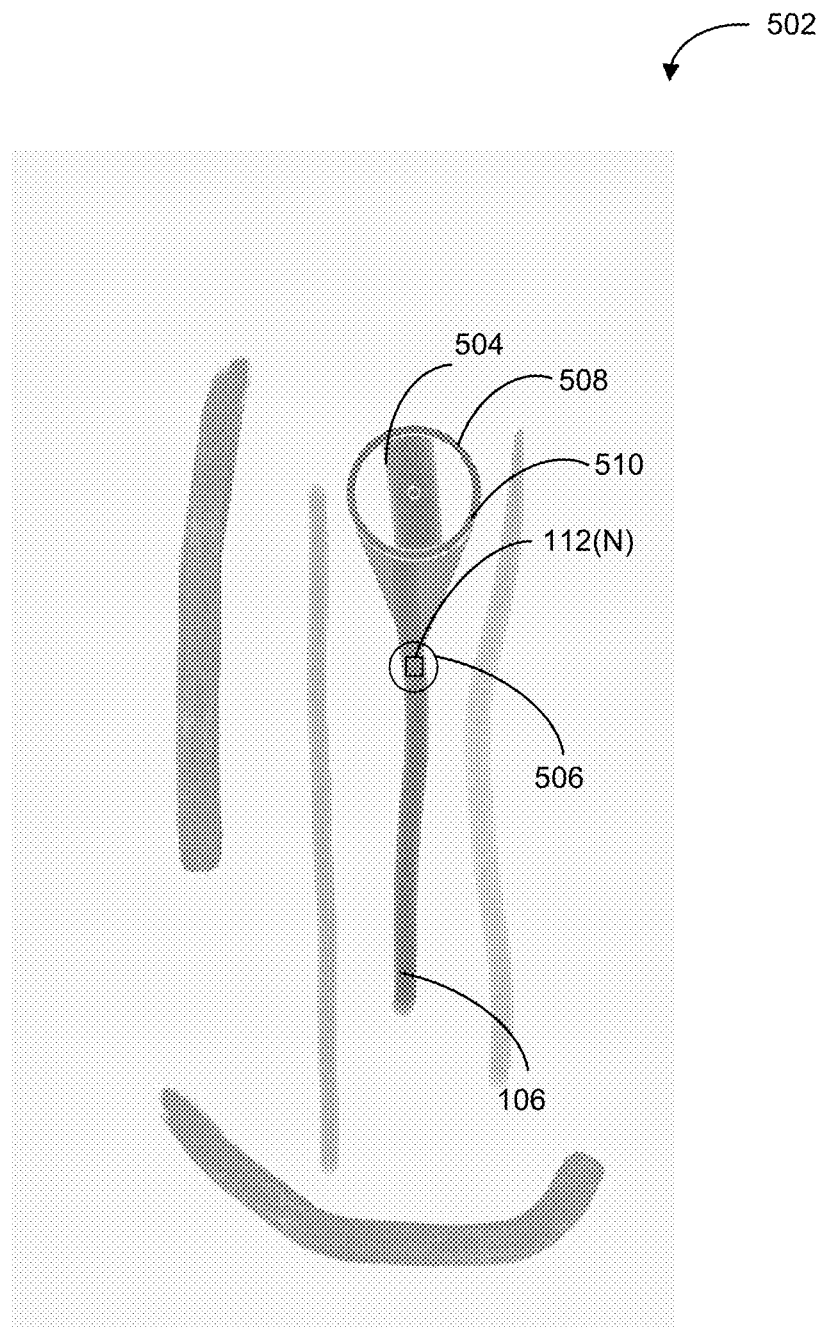
FIG. 5A and FIG. 5B are illustrations of example brush-picking tools, in accordance with some examples provided herein.

In some cases, the brush request 214 may include and/or be referred to as a brush-picking input. A brush-picking input may correspond to and/or include a user selecting a specific pixel of a brushstroke as part of a request to determine which brush was used to render the pixel. FIG. 5A illustrates an example of a brush-picking input. Specifically, FIG. 5A illustrates a canvas 502 that includes a brush-picking tool 504. In this example, a user provides a brush-picking input by placing the brush-picking tool 504 over a pixel 112(N) of the brushstroke 106 (shown in FIG. 1A). For instance, the user may drag the brush-picking tool 504 from a toolbar (such as toolbar 114 within FIG. 1A) to the location of the pixel 112(N) within the canvas 502. In some cases, the pixel selected by this brush-picking input may correspond to the pixel located within the center (or nearest to the center) of a selection area 506 of the brush-picking tool 504. The brush-picking input may include any additional or alternative mechanism and/or input, such as clicking on or touching the location of the pixel within the canvas 502, circling the location of the pixel with a stylus, among others.

In some examples, the request engine 210 may determine that the brush request 214 is provided to a specific layer of a digital canvas. For instance, the request engine 210 may determine that the specific layer is currently active (e.g., opened for editing) within the digital canvas and therefore determine that the brush request 214 is intended as a request to determine the brush used to draw a brushstroke within the specific layer. In other examples, the request engine 210 may determine that the brush request 214 is a request to determine brushes used to draw brushstrokes within any and/or all layers of the digital canvas corresponding. Similarly, if a selected pixel corresponds to two or more brushstrokes (within the same or different layers), the request engine 210 may determine that the brush request 214 is a request to determine the brush used to draw a single brushstroke (e.g., a brushstroke randomly selected from the two or more brushstrokes), or a request to determine each brush used to draw the brushstrokes. In some cases, the method by which the request engine 210 handles requests involving multiple layers and/or multiple brushstrokes may be selected or configured by a user.

The request engine 210 may periodically or continuously monitor the canvas 502 to detect user input corresponding to brush-picking inputs. Based on this monitoring, the request engine 210 may detect a brush-picking input in association with a pixel at any point after the pixel has been rendered. For instance, the request engine 210 may detect a brush-picking input while a user is editing and/or creating an initial version of a digital image (e.g., before the user has closed a file or application used to create the image). Additionally or alternatively, the request engine 210 may detect a brush-picking input after the user has accessed and/or opened the image at a later point in time. Further, the request engine 210 may detect a brush-picking input while the digital image is opened within an additional digital drawing application (e.g., an application other than the application used to create the initial version of the image). Because the brush-picking system 200 stored information indicating which brushes were used to create the image in association with each pixel of the image, this information is not lost when the image is accessed by an additional application and/or at a later point in time.

After the brush request 214 is detected, the brush-determination engine 212 may determine the brush used to render the pixel corresponding to the brush request 214. For instance, the brush-determination engine 212 may obtain the identifier of the brush stored in association with the pixel. Specifically, the brush-determination engine 212 can obtain the identifier from a data structure that stores the identifier (and optionally the rendered state of the pixel). Based on the identifier, the brush-determination engine 212 can determine properties and/or settings corresponding to the brush. For instance, as mentioned above, the identifier and/or the data structure that stores the identifier may reference a file that maps brush identifiers to properties and/or settings of a set of brushes. The brush-determination engine 212 can access and/or load this file to determine the type of the brush, as well as any configurable settings of the brush. In some cases, the file may be stored locally (e.g., as part of the application and/or the image). The brush-determination engine 212 can determine the properties and/or settings of a brush in any additional or alternative manner, such as by querying an external database or server that stores brush information. Further, if a selected pixel is associated with two more brushes, the brush-determination engine 212 may determine the identifier of each brush.

Figure 5B:
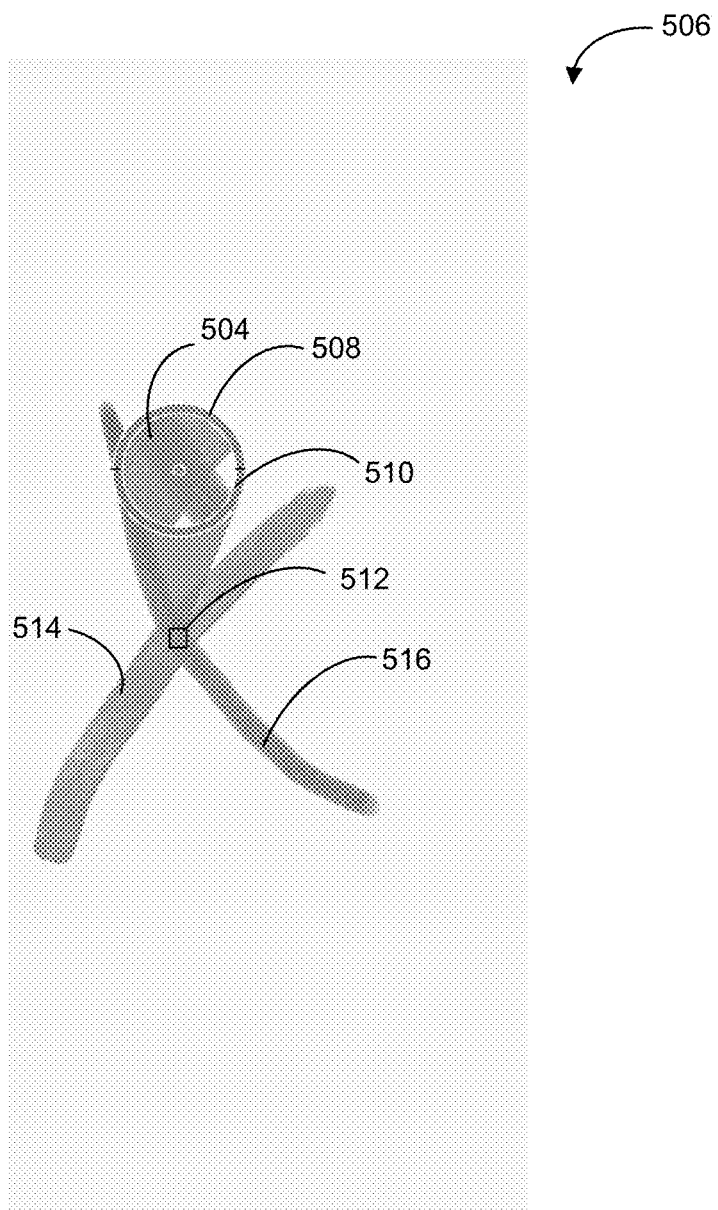

After the brush-determination engine 212 determines the brush used to render a selected pixel, the brush-determination engine 212 can provide the brush output 216 to indicate the brush to the user. The brush output 216 may include various types of visual and/or audio feedback. As an illustrative example, the brush-determination engine 212 may provide the brush output 216 by altering the appearance of all or a portion of the brush-picking tool 504 shown in FIG. 5A. In this example, the brush-determination engine 212 may set the color of a region 508 of the brush-picking tool 504 as the color of the rendered pixel (or the color selected for the brush). In addition, the brush-determination engine 212 may set the color of a region 510 of the brush-picking tool 504 as the color of the brush currently (or most recently) active within the canvas 502. Further, if a selected pixel corresponds to two more brushes, the brush-determination engine 212 may provide an indication of both brushes. For example, FIG. 5B illustrates the brush-picking tool 504 positioned over a pixel 512 that corresponds to both a brushstroke 514 and a brushstroke 516. In some cases, the brush-determination engine 212 may set the color of the regions 508 and 510 as the colors of the brushstrokes 514 and 516. Setting the color of the regions 508 and/or 510 in this way may enable the user to determine whether they have accurately selected a pixel corresponding to a desired brush. The brush-determination engine 212 may provide the brush output 216 in any additional or alternative manner, such as by displaying the name (e.g., type) of the brush within the digital canvas, displaying a graphic or icon corresponding to the brush, outputting an audio recording of the name of the brush, among others.

In some cases, providing the indication of the brush may include activating the brush within the digital canvas. For instance, the brush-determination engine 212 can replace a brush currently active within the digital canvas with the brush corresponding to the brush request 214. Specifically, the brush-determination engine 212 can configure settings of the active brush to match settings corresponding to the identifier of the brush (e.g., using information within a JSON file referenced by the data structure containing the identifier). In some examples, the brush-determination engine 212 may automatically activate the brush in response to determining the brush. For instance, the brush input 202 may represent a request for the brush to be determined and then activated. In other cases, the brush-determination engine 212 may wait to activate the brush until after receiving additional user input. This input (corresponding to a predetermined brush-activation input) may take a variety of forms, such as the user clicking or touching a toolbar or a brush-picking tool. By replicating a brush corresponding to a selected pixel within a digital image, the disclosed brush-picking systems may enable a user to quickly and easily draw new brushstrokes that exactly match the style of previously drawn brushstrokes. In this way, the disclosed brush-picking systems may improve the user's experience while creating digital images, as well as increase the quality of the created images.

An example of a process performed using the techniques described herein will now be described. FIG. 6 is a flowchart illustrating an example of a process 600 for the disclosed brush-picking techniques. At block 602, the process 600 includes detecting input associated with a drawing tool selected by a user within a digital canvas displayed by an application, the input causing at least one pixel to be rendered by a rendering engine using the drawing tool. In some cases, the input may correspond to a brushstroke being drawn within the digital canvas.

At block 604, the process 600 includes determining an identifier that uniquely identifies the drawing tool used to render the at least one pixel from a set of drawing tools provided by the application. In an illustrative example, the identifier may include an integer of a predetermined number of bits (such as 16 bits or 32 bits). In some cases, the identifier may indicate the type of the drawing tool. In addition, as illustrated by the identifier 304 in FIG. 3B, the identifier may indicate one or more configurable settings (such as the width, pressure, and/or color) of the drawing tool selected by the user.

At block 606, the process 600 includes storing the identifier of the drawing tool in association with the at least one pixel. In some cases, storing the identifier of the drawing tool may include adding the identifier to a data structure that contains data describing the rendered state of the at least one pixel. This data structure may reference a file (such as a JSON file) that maps drawing tool identifiers to properties and/or settings of drawing tools. In some examples, the process 600 may include storing the identifier as the at least one pixel is rendered. For instance, the process 600 may include storing the identifier within the data structure as a rendering engine outputs and/or determines the data describing the rendered state of the at least one pixel.

At block 608, the process 600 includes detecting user input indicating a request to determine which drawing tool of the set of drawings tools was used to render the at least one pixel. In some cases, the user input may correspond to a predetermined brush-picking input. As an illustrative example, the brush-picking input may include dragging the brush-picking tool 504 illustrated in FIG. 5A and FIG. 5B from a tool bar of the canvas 502 to the pixel 112(N). The brush-picking input may include any additional or alternative type of input, such as clicking on or touching the location of a selected pixel within the digital canvas, circling the location of the pixel with a stylus, among others. The brush-picking input may be detected at any point after the at least one pixel is rendered, including while the digital canvas is opened for editing within an application other than the application used to create an initial version of the digital canvas.

At block 610, the process 600 includes determining, in response to detecting the user input, the drawing tool from the set of drawing tools based on the identifier stored in association with the at least one pixel. In some cases, determining the drawing tool from the set of drawing tools may include obtaining the identifier of the drawing tool from the data structure that stores the identifier and then looking up properties and/or settings of the drawing tool within the file (e.g., the JSON file) referenced by the data structure. The file may indicate the type of the drawing tool, as well as any configurable settings of the drawing tool selected by the user. In some cases, the process 600 may include determining that more than one drawing tool identifier is stored in association with the at least one pixel. For instance, the at least one pixel may correspond to multiple brushstrokes (within the same or different layers). In these cases, the process 600 may include determining drawing tools corresponding to each brushstroke.

At block 612, the process 600 includes outputting, to the user, an indication of the drawing tool. In some cases, outputting the indication of the drawing tool may include indicating the color of the brushstrokes corresponding to the selected pixel (as illustrated by the brush-picking tool 504 shown in FIG. 5A and FIG. 5B). Additionally or alternatively, outputting the indication of the drawing tool may include activating the drawing tool within the digital canvas, which may enable the user to edit the digital canvas using the drawing tool. In some cases, activating the drawing tool may include replacing a currently active drawing tool with the drawing tool used to render the at least one pixel.

Figure 7:
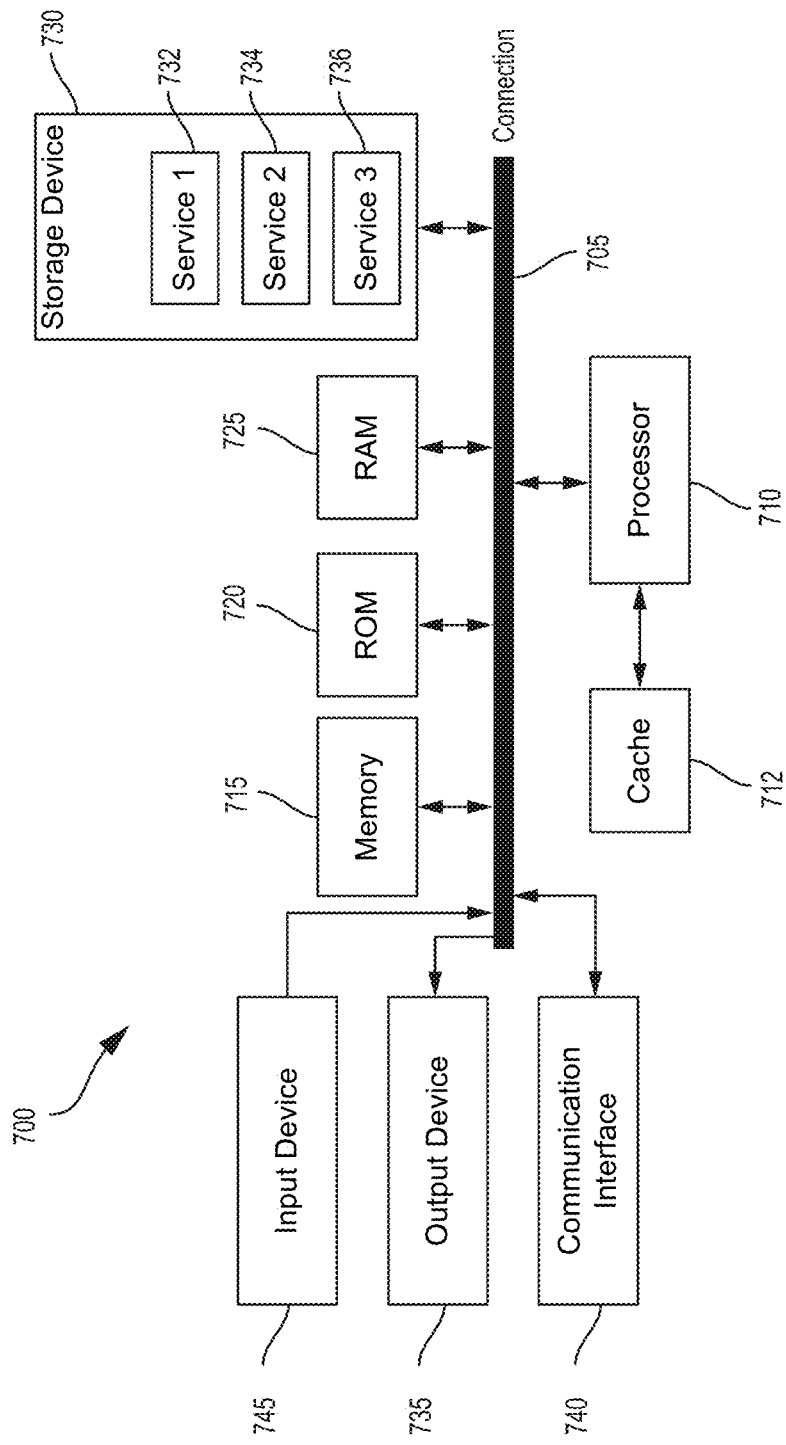
FIG. 7 is an example computing device architecture of an example computing device that can implement the various techniques described herein.

In some examples, the processes described herein (e.g., the process 600 or other process described herein) may be performed by a computing device or apparatus, such as a computing device having the computing device architecture 700 shown in FIG. 7. In one example, the process 600 can be performed by a computing device with the computing device architecture 700 implementing the brush-picking system 200 and/or the brush-picking system 400. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including the process 1200. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types.

The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 illustrates an example computing device architecture 700 of an example computing device which can implement the various techniques described herein. For example, the computing device architecture 700 can implement the brush-picking system 200 shown in FIG. 2 and/or the brush-picking system 400 shown in FIG. 4. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other modules can control or be configured to control processor 710 to perform various actions. Other computing device memory 715 may be available for use as well. Memory 715 can include multiple different types of memory with different performance characteristics. Processor 710 can include any general purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for associating digital drawing tools with content generated by the digital drawing tools, comprising:
   detecting input associated with a drawing tool selected by a user within a digital canvas displayed by an application, the input causing at least one pixel of the digital canvas to be rendered by a rendering engine using the drawing tool;
   determining an identifier that uniquely identifies the drawing tool used to render the at least one pixel from a set of drawing tools provided by the application;
   storing the identifier of the drawing tool in association with the at least one pixel;
   detecting user input indicating a request to determine the drawing tool of the set of drawing tools used to render the at least one pixel;

determining, in response to detecting the user input, the drawing tool from the set of drawing tools based on the identifier stored in association with the at least one pixel; and outputting, to the user, an indication of the drawing tool.

2. The method of claim 1, wherein detecting the input associated with the drawing tool includes detecting a brushstroke drawn by the user using the drawing tool.

3. The method of claim 1, wherein determining the identifier of the drawing tool includes determining an identifier corresponding to one or more configurable settings of the drawing tool selected by the user.

4. The method of claim 1, wherein storing the identifier of the drawing tool in association with the at least one pixel includes:

including the identifier within a data structure that contains data describing a rendered state of the at least one pixel; and storing the data structure in association with the at least one pixel.

5. The method of claim 1, wherein storing the identifier of the drawing tool in association with the at least one pixel includes storing the identifier while the rendering engine renders the at least one pixel.

6. The method of claim 1, wherein storing the identifier of the drawing tool in association with the at least one pixel includes storing a separate instance of the identifier in association with each pixel of the at least one pixel.

7. The method of claim 1, wherein detecting the user input indicating the request to determine which drawing tool was used to render the at least one pixel includes detecting a predetermined tool-picking input, the predetermined tool-picking input including selection of the at least one pixel within the digital canvas.

8. The method of claim 1, wherein outputting the indication of the drawing tool includes activating the drawing tool within the application, wherein activating the drawing tool enables a user that provided the user input to edit the digital canvas using the drawing tool.

9. The method of claim 1, wherein storing the identifier of the drawing tool in association with the at least one pixel includes storing the identifier in association with a layer of the digital canvas to which the input associated with the drawing tool is provided, the layer corresponding to a logical division of the digital canvas containing content rendered on top of or below at least one additional layer.

10. The method of claim 1, further comprising:

detecting additional input associated with an additional drawing tool, the additional input causing the at least one pixel to be re-rendered by the rendering engine using the additional drawing tool; and storing an additional identifier of the additional drawing tool in association with the at least one pixel, the additional identifier uniquely identifying the additional drawing tool from the set of drawing tools provided by the application.

11. The method of claim 10, wherein:

determining the drawing tool from the set of drawing tools used to render the at least one pixel includes determining the drawing tool and the additional drawing tool; and outputting the indication of the drawing tool includes outputting the indication of the drawing tool and an additional indication of the additional drawing tool.

12. A system for associating digital drawing tools with content generated by the digital drawing tools, comprising:

one or more processors; and memory accessible to the one or more processors, the memory storing instructions, which upon execution by the one or more processors, cause the one or more processors to:

detect user input corresponding to a request to determine a drawing tool used to draw at least one pixel of a brushstroke within a digital canvas displayed by an application, the user input including selection of the at least one pixel within the digital canvas;

in response to detecting the user input, obtain an identifier of the drawing tool stored in association with the at least one pixel, wherein the identifier uniquely identifies the drawing tool within a set of drawing tools provided by the application; and activate the drawing tool within the application, wherein activating the drawing tool enables a user that provided the user input to edit the digital canvas using the drawing tool.

13. The system of claim 12, wherein activating the drawing tool within the application includes:

accessing a file referenced by a data structure in which the identifier is stored, the file mapping the identifier to one or more settings of the drawing tool; and activating the drawing tool based on the one or more settings of the drawing tool.

14. The system of claim 12, wherein detecting the user input indicating the request to determine the drawing tool used to draw the at least one pixel includes detecting a predetermined tool-picking input corresponding to the user dragging a tool-picking icon from a toolbar of the digital canvas to the at least one pixel.

15. The system of claim 12, wherein an initial version of the digital canvas is created using an additional application, the additional application being different than the application used by the user to edit the digital canvas using the drawing tool.

16. A non-transitory computer-readable medium having stored thereon instructions that, when executed by one or more processors, cause the one or more processors to:

detect input associated with a drawing tool selected by a user within a digital canvas displayed by an application, the input causing at least one pixel of the digital canvas to be rendered by a rendering engine using the drawing tool;

determine an identifier that uniquely identifies the drawing tool used to render the at least one pixel from a set of drawing tools provided by the application;

store the identifier of the drawing tool in association with the at least one pixel;

detect user input indicating a request to determine the drawing tool of the set of drawing tools used to render the at least one pixel;

determine, in response to detecting the user input, the drawing tool from the set of drawing tools based on the identifier stored in association with the at least one pixel; and output, to the user, an indication of the drawing tool.

17. The non-transitory computer-readable medium of claim 16, wherein determining the identifier of the drawing tool includes determining an identifier corresponding to one or more configurable settings of the drawing tool selected by the user.

18. The non-transitory computer-readable medium of claim 17, wherein the one or more configurable settings of the drawing tool include at least one of:

a width of brushstrokes drawn by the drawing tool;

a color of brushstrokes drawn by the drawing tool;

a density of brushstrokes drawn by the drawing tool; and
a texture of brushstrokes drawn by the drawing tool.

19. The non-transitory computer-readable medium of claim 17, wherein the identifier of the drawing tool includes an integer value of a predetermined number of bits, wherein a subset of the bits corresponds to one configurable setting of the drawing tool and at least one additional subset of the bits corresponds to an additional configurable setting of the drawing tool.

20. The non-transitory computer-readable medium of claim 17, wherein a data structure references a file that maps the identifier to the one or more configurable settings of the drawing tool.

\* \* \* \* \*